US008135815B2

(12) United States Patent
Mayer

(10) Patent No.: US 8,135,815 B2
(45) Date of Patent: *Mar. 13, 2012

(54) METHOD AND APPARATUS FOR NETWORK WIDE POLICY-BASED ANALYSIS OF CONFIGURATIONS OF DEVICES

(75) Inventor: Alain Jules Mayer, San Francisco, CA (US)

(73) Assignee: Redseal Systems, Inc., San Mateo, CA (US)

( * ) Notice: Subject to any disclaimer, the term of this patent is extended or adjusted under 35 U.S.C. 154(b) by 1040 days.

This patent is subject to a terminal disclaimer.

(21) Appl. No.: 11/270,806

(22) Filed: Nov. 8, 2005

(65) Prior Publication Data

US 2006/0129670 A1 Jun. 15, 2006

Related U.S. Application Data

(63) Continuation-in-part of application No. 09/954,327, filed on Sep. 17, 2001, now Pat. No. 7,003,562.

(51) Int. Cl.
*G06F 15/16* (2006.01)
(52) U.S. Cl. ........................ 709/223; 709/221
(58) Field of Classification Search .................. 709/221, 709/224
See application file for complete search history.

(56) References Cited

U.S. PATENT DOCUMENTS

| 4,870,561 | A | | 9/1989 | Love et al. |
| 4,951,192 | A | * | 8/1990 | Chase et al. .................. 717/149 |
| 5,175,800 | A | | 12/1992 | Galis et al. |
| 5,440,719 | A | | 8/1995 | Hanes et al. |
| 5,598,532 | A | * | 1/1997 | Liron .............................. 703/2 |
| 5,978,568 | A | | 11/1999 | Abraham et al. |
| 6,205,552 | B1 | * | 3/2001 | Fudge ............................. 726/25 |
| 6,212,558 | B1 | * | 4/2001 | Antur et al. .................... 709/221 |
| 6,243,747 | B1 | * | 6/2001 | Lewis et al. ................... 709/220 |
| 6,282,712 | B1 | | 8/2001 | Davis et al. |
| 6,298,445 | B1 | * | 10/2001 | Shostack et al. ............... 726/25 |
| 6,301,668 | B1 | * | 10/2001 | Gleichauf et al. .............. 726/25 |
| 6,377,987 | B1 | | 4/2002 | Kracht |
| 6,393,386 | B1 | | 5/2002 | Zager et al. |
| 6,430,526 | B1 | | 8/2002 | Toll |
| 6,484,261 | B1 | | 11/2002 | Wiegel |

(Continued)

OTHER PUBLICATIONS

Phillips, Cynthia, "A Graph-Based System for Network-Vulnerability Analysis" [Online], 1998 [retrieved on Feb. 2009], ACM, <http://portal.acm.org/citation.cfm?id=310919>, pp. 71-79.*

(Continued)

*Primary Examiner* — Bunjob Jaroenchonwanit
(74) *Attorney, Agent, or Firm* — Kilpatrick Townsend & Stockton LLP; Kenneth R. Allen

(57) ABSTRACT

A method for a computer system includes determining network devices within a network topology, wherein the network devices includes a first application server hosting a first application, receiving a policy for the network comprising requirements of a first application server including a description of a set of required network traffic, receiving a plurality of configuration files associated with the plurality of network devices, determining a network configuration model in response to the plurality of configuration files, computing network traffic on all network paths to and from the first application server to determine a plurality of computed paths, determining if the network traffic includes at least the set of required network traffic associated with the first server, and generating a report indicating whether the network traffic includes at least the set of required network traffic.

29 Claims, 10 Drawing Sheets

U.S. PATENT DOCUMENTS

| | | | |
|---|---|---|---|
| 6,574,737 B1* | 6/2003 | Kingsford et al. | 726/25 |
| 6,820,042 B1 | 11/2004 | Cohen et al. | |
| 7,003,562 B2* | 2/2006 | Mayer | 709/223 |
| 7,016,980 B1* | 3/2006 | Mayer et al. | 709/249 |
| 7,031,895 B1 | 4/2006 | Takahashi et al. | |
| 7,047,423 B1* | 5/2006 | Maloney et al. | 726/2 |
| 7,496,960 B1* | 2/2009 | Chen et al. | 726/22 |
| 7,680,644 B2 | 3/2010 | Rappaport et al. | |
| 2002/0021675 A1* | 2/2002 | Feldmann | 370/254 |
| 2002/0093527 A1* | 7/2002 | Sherlock et al. | 345/736 |
| 2002/0103631 A1 | 8/2002 | Feldmann et al. | |
| 2003/0120955 A1 | 6/2003 | Bartal et al. | |
| 2005/0193430 A1 | 9/2005 | Cohen et al. | |
| 2006/0129670 A1* | 6/2006 | Mayer | 709/223 |
| 2006/0129672 A1* | 6/2006 | Mayer | 709/223 |

OTHER PUBLICATIONS

Chung et al., Simulating Concurrent Intrusions for Testing Intrusion Detection Systems: Parallelizing Intrustions, Proc of the 1995, NISSC, Baltimore, MD, 11 pages, (found at http://seclab.cs.ucdavis.edu/papers.html), 1995.*

Alaettinoglu et al., "Routing Policy Specification Language (RPSL)", pp. 1-62 (The Internet Society, website: http://www.ietf.org/rfc/rfc2622.-txt, Jun. 1999).

Mahon et al., "Requirements for a Policy Management Systems", pp. 1-19 (The Internet Society, website: http://www.ietf.org/internet-drafts-- ietf-policy-req-02.txt, Nov. 9, 2000).

Mayer et al., "Fang: A Firewall Analysis Engine", pp. 1-11 (21.sup.st IEEE Symposium on Security & Privacy, Oakland, CA, May 2000).

McCarthy, "Intranet Security, stories from the trenches", pp. xxiii-xxv (Sun Microsystems, Inc., Mountain View, CA, 1998).

Open Security Extension, pp. 1-2 (Check Point Software Technologies Ltd., 1999).

Routing Information Protocol (RIP), pp. 44-1 to 44-4 (Internetworking Technology Overview, Jun. 1999).

Shipley, "Cisco IOS: It's Not Just for Running Anymore", pp. 1-4 (website: http://www.networkcomputing.com/shared/printArticle?article.../- 1011ws1full.html&pub=nw, May 31, 1999).

The Next Big Internet Hurdle: Configuration Management, pp. 1-10 (Gold Wire Technology, Dec. 2000).

Verma, "Policy-Based Networking, Architecture and Algorithms", pp. 5-25 (New Riders Publishing, Indianapolis, IN, Nov. 2000).

Visual Policy Editor, 2 pages, (website: http://www.checkpoint.com/produ- cts/vpe.html, May 21, 2001).

Walker et al., "Computer Security Policies and SunScreen Firewalls", pp. 1-17 (Sun Microsystems, Inc., Palo Alto, CA, 1998).

Wynston, "Cisco Enterprise Management Solutions, vol. 1", pp. 143-183 (Cisco Press, Indianapolis, IN, 2001).

Yasin, "Policy Management Hits the Web", pp. 1-3 (website: http://www.pentasafe.com/new/internetweek.htm, Jan. 8, 2001).

Office Action for U.S. Appl. No. 11/335,052, dated Sep. 17, 2009.

Office Action for U.S. Appl. No. 11/335,052, dated May 10, 2010.

Office Action for U.S. Appl. No. 09/954,327, dated Dec. 15, 2004.

Office Action for U.S. Appl. No. 09/954,327, dated Jun. 17, 2005.

Notice of Allowance for U.S. Appl. No. 09/954,327, dated Oct. 11, 2005.

* cited by examiner

METHOD AND APPARATUS FOR NETWORK WIDE POLICY-BASED ANALYSIS OF CONFIGURATIONS OF DEVICES

CROSS-REFERENCES TO RELATED APPLICATIONS

This application is a continuation-in-part of U.S. patent application Ser. No. 09/954,327 filed Sep. 17, 2001 which claims the benefit of provisional application Ser. No. 60/279,190, filed Mar. 27, 2001. The above disclosures are hereby incorporated by reference for all purposes.

BACKGROUND OF THE INVENTION

The present invention relates generally to Internet Protocol (IP) network devices, such as firewalls, routers, switches, application servers, and more particularly, to a method and apparatus for policy-based analysis of the configurations of the network devices.

A computer network's basic functionality is determined by the configuration of the network devices present in the network. Network devices include routers, network switches, application servers, firewalls, and virtual private networks.

In the present disclosure, the following terms are defined in an open-ended manner. Such definitions are believed to comport to understanding of one of ordinary skill in the art, unless used in a contrary manner.

A router is a network gateway that joins two or more IP networks and switches packets between the networks. A network administrator can implement a high-level corporate routing policy by configuring the settings of each router in the network, including setting static routes, one or more dynamic routing protocols, suppressing dynamic routing updates on a per-interface basis, and setting routing preferences.

A network switch is a multi-port network bridge, which is generally capable of supporting multiple media types. A network bridge forwards datagrams (packets) according to media type and address (e.g., Ethernet). A network administrator can configure a network switch in much the same way as configuring a router.

A host application server is a host (computer) that offers one or more services (e.g. applications) in an application layer used by other networked computers to simplify the operations of the network. Examples of servers in the application layer include: DNS (domain name servers), mail (electronic mail), e-commerce servers (e.g. WebLogic), web servers (e.g. IIS, Apache), billing servers, database servers (e.g. Oracle, SAP), data storage servers, and other hosts for other network applications in the network such as enterprise resource planning (ERP) applications, customer relationship management (CRM) applications, and the like. As is well-known, host application servers may include one or more computers, possibly in a distributed arrangement.

A network administrator can configure the software for the particular application service and can also configure the host application server itself (e.g., access control to the computer via TCP wrapper configuration).

A firewall is a network gateway that filters packets and separates a proprietary corporate network, such as an intranet, from a public network, such as the Internet. Most of today's firewalls are configured by means of a rule-base. A network administrator can implement a high-level corporate security policy by creating a low-level rule-base for each firewall interface in the corporate network.

A virtual private network (VPN) is a network device that secures the privacy of corporate data outside the perimeter of the corporate network. A network administrator can configure VPN devices so that corporate data sent over the public Internet (e.g., from the corporate headquarters to a remote company site) is adequately secured. This typically involves configuring settings for cryptographic key exchanges, choosing the appropriate encryption for sending data (e.g., IP packets) according to the destination, etc.

A network topology is a formal description (including IP-addresses, device description, etc.) of the network devices interconnecting the sub-networks and application hosts in the network.

A network policy, also known as business applications requirements, is a formal description of the intended capabilities and properties of the devices within the network layer as well as the hosts within the application layer. The terms network policy and business applications requirements are thus interchangeable within the context of the present disclosure.

A configuration file contains configuration data for a single network device, such as a router, firewall, or server.

A network configuration model is a data model for representing a global configuration of the network, which uses the configuration files as building blocks. As will be discussed below, in various embodiments, a network configuration model is formed, in part, as a result of a software simulation of the network based upon the configuration file, network topology, and the like.

A network configuration store is a device for storage of network configuration models.

A network administrator, or a group of administrators in a larger enterprise, is typically responsible for configuring all the network devices in a network, in such a way that the network devices can cooperatively enforce a corporate network policy.

The inventor has determined that errors within configuration files of one or more network devices within a network may vitiate a carefully-defined network policy. Such errors in one or more configuration files may also go undetected for a long time. As an example, a router configuration error can prevent IP traffic from the Internet, which is necessary for one or more application hosts (computers) within the corporate network (enterprise), from being provided to such hosts. Accordingly, such application servers will be inoperative because the required network IP communication are absent. For example, if the application server were a database server, the data may thus be inaccessible.

Another possible type of error for a network determined by the inventor is that router configuration errors may allow "too much" IP traffic from the Internet, to reach application hosts (computers). In other words, network devices may allow IP traffic to reach application hosts who do not expect IP traffic of that type. The inventor has determined that such cases are potential security risks in the network because the network configuration is too permissive.

The inventor has determined that traditional IP network management software does not typically generate any alerts when not enough IP traffic is provided to an application server or when too much IP traffic can reach an application server. Because traditional IP network management software only focuses on the network layer, in either of the above cases, the software would report normal operation of the network when the routers were up and running normally.

In light of the above, what is desired are methods and apparatus for determining whether business application requirements are fulfilled by specific configurations of networks.

BRIEF SUMMARY OF THE INVENTION

One aspect of the present invention is directed to a method and an apparatus for analyzing a network configuration against a corporate network policy and determining violation(s) against the corporate network policy. A report indicating the violation(s) can be generated indicating instances of the violation(s). An analysis platform (e.g., available from the assignee) reads in a network policy. A Policy Modeling Language (PML), for example, can be used to define an instance of the network policy. The analysis platform collects configuration files from the relevant network devices and builds up an internal instance of a network configuration model based on the configuration files and the network topology. The analysis platform analyzes this network configuration model according to the network policy and adds an entry to its final report each time that it detects a violation against the network policy in the network configuration model. The data in the entries pinpoints the cause of the deviation(s) from the network policy.

According to another aspect of the present invention, the network policy describes capabilities for particular hosts in the network, such as "mail server," "DNS server," etc. The analysis platform receives the network policy as an input and then analyzes the network configuration model to verify that the IP traffic from and to these hosts are limited according to the type of service, and to ensure that the right type of IP traffic get from/to a host, which includes the configuration of relevant routers for switching traffic, firewalls for passing through or dropping traffic, and local access control mechanisms on the host (e.g., TCP wrappers) for making the services accessible. Thus, the network administrator (and his/her management, e.g., Chief Information Officer (CIO)) can determine that relevant IP traffic, and only relevant IP traffic, is able to reach the hosts.

According to yet another aspect of the present invention, the network policy describes routes (e.g., sequences of IP addresses of gateways and routers) that the IP traffic should take between different sites of the same enterprise. The analysis platform receives the network policy as an input and then analyzes the configuration of the relevant routers and network switches to verify that the routes taken by the IP traffic within the enterprise, among the different corporate sites, adhere to the network policy.

According to various embodiments of the present invention, an analysis of business application requirements includes determining whether a potential change in the network configuration, would "break" a host application. Some types of changes include replacing hardware, adding new hardware, reconfiguring a network topology, reconfiguring hardware, migrating an application from a first server to a second server, upgrading an application to another version (e.g. 5.0 to 6.0), and the like. Many other types of changes can be contemplated in light of the present disclosure. In various embodiments, a potential change in a network policy may also "break" the applications.

The inventor believes that determining violations of a network policy before an actual change in a network configuration, or network policy, is highly advantageous. Such embodiments allow problems in a network policy to be determined before the change becomes "live." Because, operation of a network can be predicted in software, actual problems in a network may be avoided.

According to various embodiments, a host application maybe considered "broken" when the host application server does not receive the type of IP traffic it requires. Other causes include, when the host application server cannot reach or send IP traffic to a particular destination, or the like. In various embodiments, the business application requirements includes a description of input IP traffic required for applications and host applications servers, as well as output IP traffic necessary for applications and host application servers. In both of these cases, the business application requirements of a network policy is violated.

According to various embodiments, a host application maybe considered "vulnerable" when the host application server receives IP traffic in excess of what is necessary, or the like. In such cases, a violation of the network policy would indicate the existence of a "hole" in network security. The inventor has determined that such holes could be exploited by viruses, worms, hackers, and the like. Accordingly, embodiments of the present invention are highly advantageous by being able to locate and report such problems.

According to additional embodiments, potential threats to a network, such as a virus, worm, Trojan, key logger, spyware, adware, and the like may be specifically tested using the principles described herein. In various embodiments, such threats can be also termed applications or "negative" applications. In contrast, "legitimate" or desired business applications may also be termed "positive" applications. In various embodiments, the IP traffic associated with such negative applications, or threats, and servers targeted by such threats are defined as "requirements" of the negative applications. Targeted servers may include one specific server, any server that meets the threat's requirements, a class of servers (e.g. all web servers), or the like. As will be described in greater depth below a network configuration model may be generated with the threat modeled as a "negative application" on an application host. Similar to the above, determination is then made based upon the network configuration model whether the host of the negative application can receive the IP traffic the threat desires and/or whether the host of the negative application can communicate with servers it is targeting.

In various embodiments, a library of threats may be specified. Additionally, for each threat from the library, a degree of threat may be associated therewith. As an example, if a modeled threat (e.g. virus) from the library cannot reach a database server it "needs to," the virus threat may be rated as a low-level threat. In contrast, if a modeled threat (e.g. worm) can reach the database server it is targeting, the worm may be rated as a high-level threat. As described further below, additional factors may be used to rate or prioritize threat, such as threat probability or likelihood of attack, routing requirements (chain of attack) of the threat, how deep within a corporate network the threat can penetrate, and the like.

According to one aspect of the invention a method for a computer system is described. One technique includes determining a plurality of network devices within a network arranged in a network topology, wherein the plurality of network devices includes a first application on a first application server, and receiving a policy for the network, wherein the policy comprises requirements associated with the first application server, wherein the requirements include a description of a first set of required network traffic and a first server associated with the first set of required network traffic. One process includes receiving a plurality of configuration files associated with the plurality of network devices, determining a network configuration model in response to the plurality of configuration files and computing network traffic on all network paths from the first application server to the first server to determine a first plurality of computed paths. A method includes determining if the network traffic that was computed is less than the first set of required network traffic associated with the first server, and generating a report indicating whether the network traffic is less than the first set of required network traffic.

According to another aspect of the invention, a computer system is described. One apparatus includes a memory configured to store a network topology of a network including a plurality of network devices, wherein the plurality of network devices includes a first application on a first application host, wherein the memory is configured to store a policy associated with the network, wherein the policy comprise requirements associated with the first application, wherein the requirements includes a first required set of network traffic from the first application and a second application host associated with the first required set of network traffic, and wherein the memory is configured to store a plurality of configuration data from at least some of the plurality of network devices. A system includes a processor coupled to the memory, wherein the processor is configured to determine a network configuration model in response to the plurality of configuration data, and in response to the network topology, wherein the processor is configured to receive a query regarding the first application, wherein the processor is configured to compute network traffic on all network paths from the first application host to the second application host in response to the network configuration model, in response to the query, and in response to the policy associated with the network to form a first plurality of computed paths, and wherein the processor is configured to generate a report indicating whether the network traffic is less than the first required set of network traffic. In various embodiments, the memory is also configured to store the network configuration model.

According to another aspect of the invention, a computer program product for a computer system including a memory is described. The computer program product includes code that directs the processor to determine a revised network topology in response to a network topology and in response to user input, code that directs the processor to determine a plurality of network devices within a network arranged in the revised network topology, wherein the plurality of network devices includes a first application on a first application server, and code that directs the processor to receive a policy for the network, wherein the policy comprises requirements associated with the first application server, wherein the requirements include a description of a first set of required network traffic and a first server associated with the first set of required network traffic. A computer program product may also include code that directs the processor to receive a plurality of configuration data associated with the plurality of network devices, code that directs the processor to determine a network configuration model in response to the plurality of configuration data and to the revised network topology, code that directs the processor to compute network traffic on all network paths from the first application server to the first server to determine a first plurality of computed paths, code that directs the processor to determine whether the network traffic that was computed is less than the first set of required network traffic, and code that directs the processor to generate a report indicating whether the network traffic is less than the first set of required network traffic. The codes may reside on a tangible media, such as a magnetic memory (e.g. disk drive), an optical memory (e.g. DVD, CD), a semiconductor memory (e.g. RAM, ROM, flash memory), or the like.

BRIEF DESCRIPTION OF THE DRAWINGS

A more complete understanding of the present invention and its advantages will be readily apparent from the following Detailed Description taken in conjunction with the accompanying drawings. Throughout the accompanying drawings, like parts are designated by like reference numbers and in which.

DETAILED DESCRIPTION OF THE INVENTION

Figure 1:
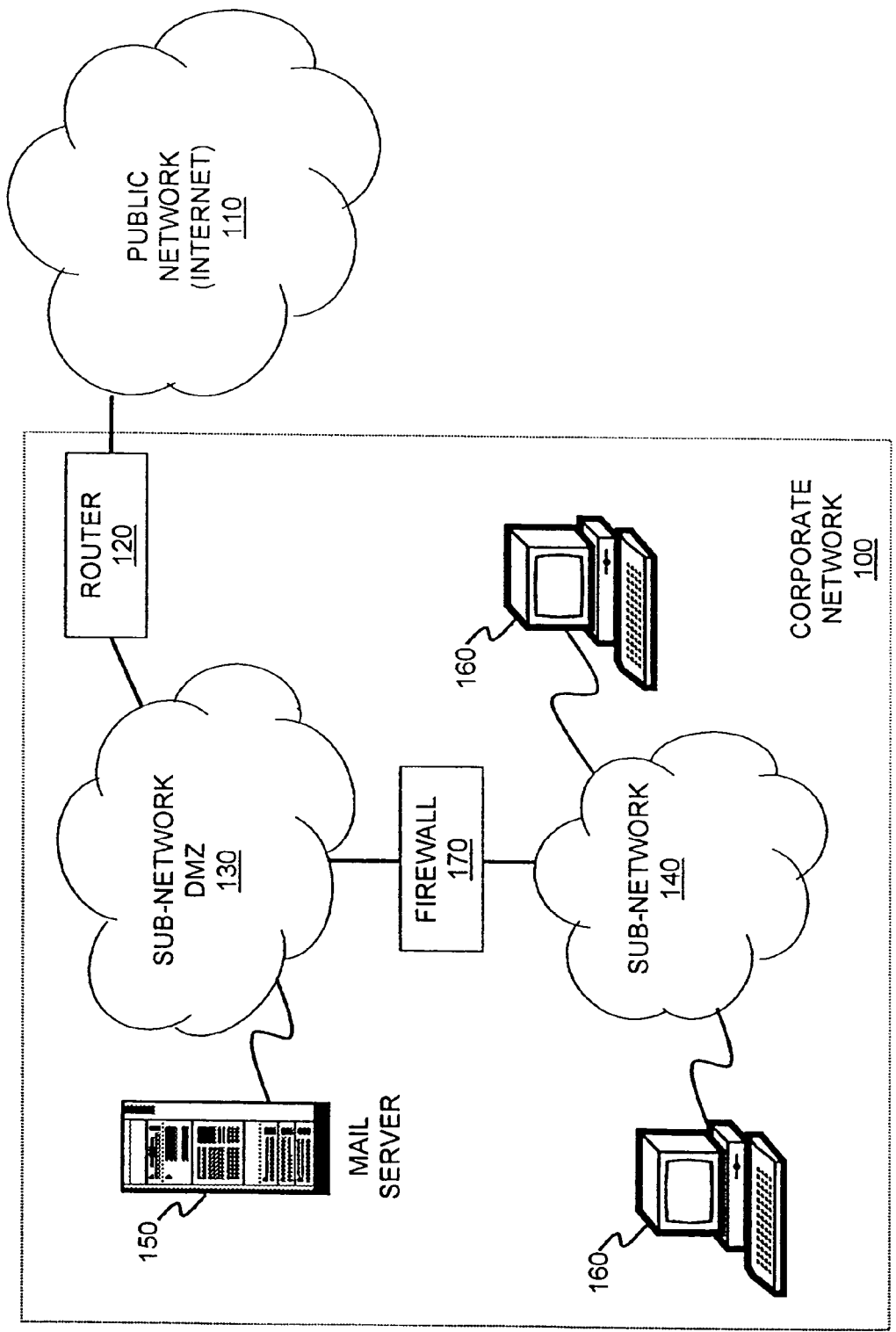
FIG. 1 is a schematic illustration of a computer network in accordance with the present invention.

FIG. 1 schematically illustrates a hardware environment of an embodiment of the present invention. A corporate network 100 is coupled to a public network 110 (e.g., the Internet) via a router 120. The corporate network 100 contains a plurality of sub-networks, including a sub-network dmz 130 and a second sub-network 140. The sub-network dmz 130 is coupled to the router 120 and contains a host (server) 150 (an application server e.g., a hardened mail server) for providing one or more services or applications within the corporate network 100. The second sub-network 140 contains a plurality of networked computers 160. A firewall 170 filters packets between the second sub-network 140 and the public network 110 to provide security for the networked computers 160 in the corporate network 100.

Figure 2:
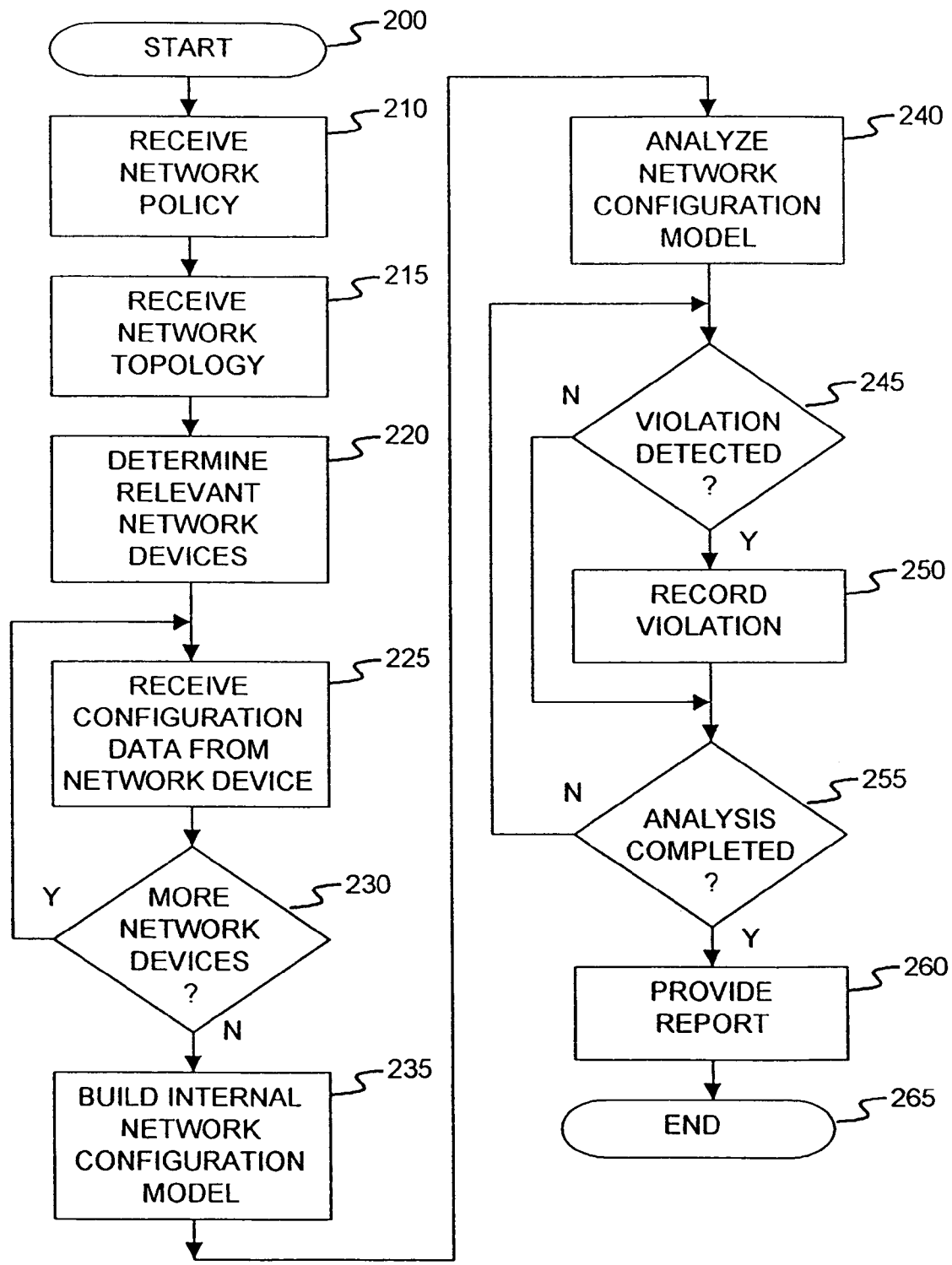
FIG. 2 is a flow diagram illustrating a method for determining violation(s) of a network policy in accordance with the present invention.

FIG. 2 is a flow diagram illustrating the operation of an analysis platform (e.g., available from the assignee) in accordance with the present invention. The process starts at step 200. In step 210, the analysis platform receives a network policy (business applications requirements), which may be defined by a network administrator. Examples of business applications requirements include: a billing application server (e.g., WebLogic) needs to communicate with a billing database (Oracle) over TCP and destination port 43; and an e-commerce front-end server needs to communicate with a billing front-end server over TCP and destination ports 56 and 67. Other such examples are contemplated. The network policy or requirements may, for example, be stored in a network policy or requirements store on the analysis platform.

Then, in step 215, the analysis platform receives information regarding a topology of the network devices (e.g., router 120, server 150, firewall 170) in the corporate network 100. In step 220, the analysis platform determines which of the network devices in the corporate network 100 are relevant to the network policy. The determination of relevancy is based on the network topology and/or the network policy. Then, in step 225, the analysis platform receives configuration data from one or more of the relevant network devices. The configuration data for a particular network device may be determined by reading the configuration file of the network device, for example.

Then, in a decisional step 230, the analysis platform determines whether there are other relevant network devices remaining. If so (Yes in step 230), the process repeats step 225 and the analysis platform receives configuration data from additional relevant network devices. Otherwise (No in step 230), the process continues to step 235, wherein the analysis platform builds an internal software model of the network termed network configuration model.

Then, in step 240, the analysis platform analyzes the network configuration model against the network policy or business applications requirements to determine whether the network configuration model violates the network policy or requirements (i.e., whether a violation exists). In step 245, the analysis platform determines whether a violation of the network policy has been detected. If so (Yes in step 245), the violation is recorded in step 250 and the process continues to step 255. Otherwise (No in step 245), the process continues to step 255.

In step 255, the analysis platform determines whether the analysis has been completed. If not (No in step 255), the process returns to step 245 and continues to detect for violations of the network policy. If the analysis is complete (Yes in step 255), the process continues to step 260 wherein the analysis platform provides a report indicating the violation(s), if any, of the network policy. The report includes specific instance(s) where a device configuration causes a violation in the network policy. The process then ends in step 265.

As will be described below, violations may be determined under various conditions. For example, a violation may be determined when a host application server does not receive all the IP traffic it requires. As another example, a violation may be determined when a host application server cannot send IP traffic to required destinations. As another example, a violation may be determined when a "negative" host application server (e.g. worm) can reach a required destination or can reach a server within the corporate network. Examples of negative applications include Sasser, UDP 1443, and the like. These applications may be hosted by servers within corporate network 100 or external to corporate network 100.

Figure 3:
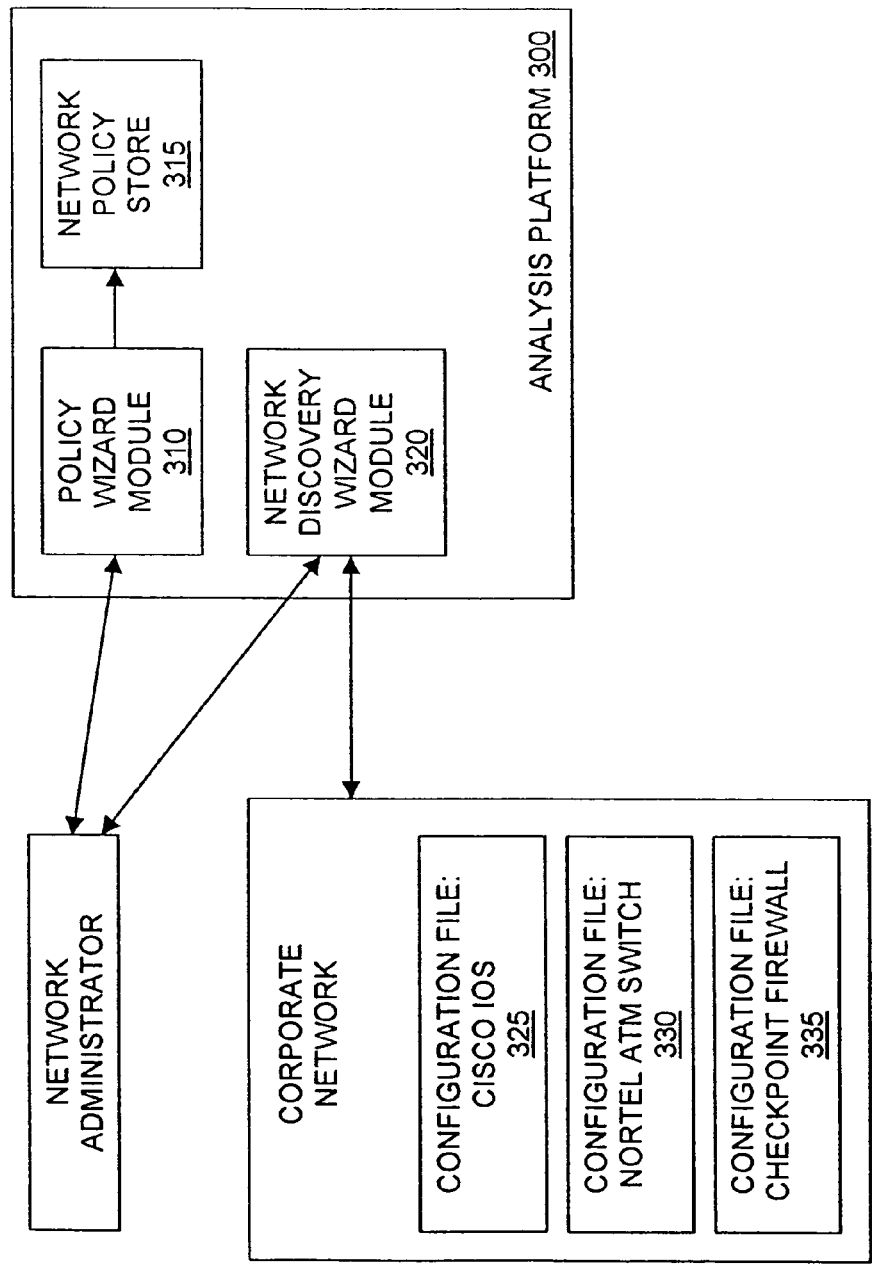
FIG. 3 is a block diagram illustrating a portion of the operating modules of an analysis platform in accordance with the present invention.

FIG. 3 is a block diagram illustrating a portion of the operating modules of an embodiment of an analysis platform (e.g., available from the assignee) 300. The analysis platform 300 includes a Policy Wizard Module 310 for assisting a network administrator with the creation of a network policy for the corporate network. As discussed above, the network policy, or business applications requirements includes a specification of the desired communication behavior of devices both within the network layer and the application layer. In various embodiments, the business applications requirements include communications requirements of host applications on host applications servers. In other embodiments, the business applications requirements include communications requirements, target servers (specific servers, specific classes of servers, or the like), routing paths, and the like of negative applications, such as worms, and other threats.

Once the network policy has been created, it can then be stored in a network policy store 315 in the analysis platform 300.

The analysis platform 300 further includes a Network Discovery Wizard Module 320 for collecting data regarding the basic network connectivity (e.g., the network topology). The Network Discovery Wizard Module 320 can guide the network administrator through the process of defining the locations of the configuration files of the network devices in the corporate network that are to be analyzed by the analysis platform 300. The configuration files are typically basic text (ASCII) files such as, a configuration file 325 for a Cisco router using IOS (Internet Operating System) commands, a configuration file 330 for a Nortel switch, and a configuration file 335 for a Checkpoint firewall. In light of the present disclosure, one of ordinary skill in the art will recognize configuration descriptions may be accessed from other types of network devices, in other embodiments. Once the network topology and locations of the configuration files have been defined, the analysis platform 300 can retrieve the configuration files from the relevant network devices as required.

In various embodiments of the present invention, negative applications, or threats may be modeled as a host application server on the public network 110. Further the configuration of the negative host application servers are typically be predefined.

Figure 4:
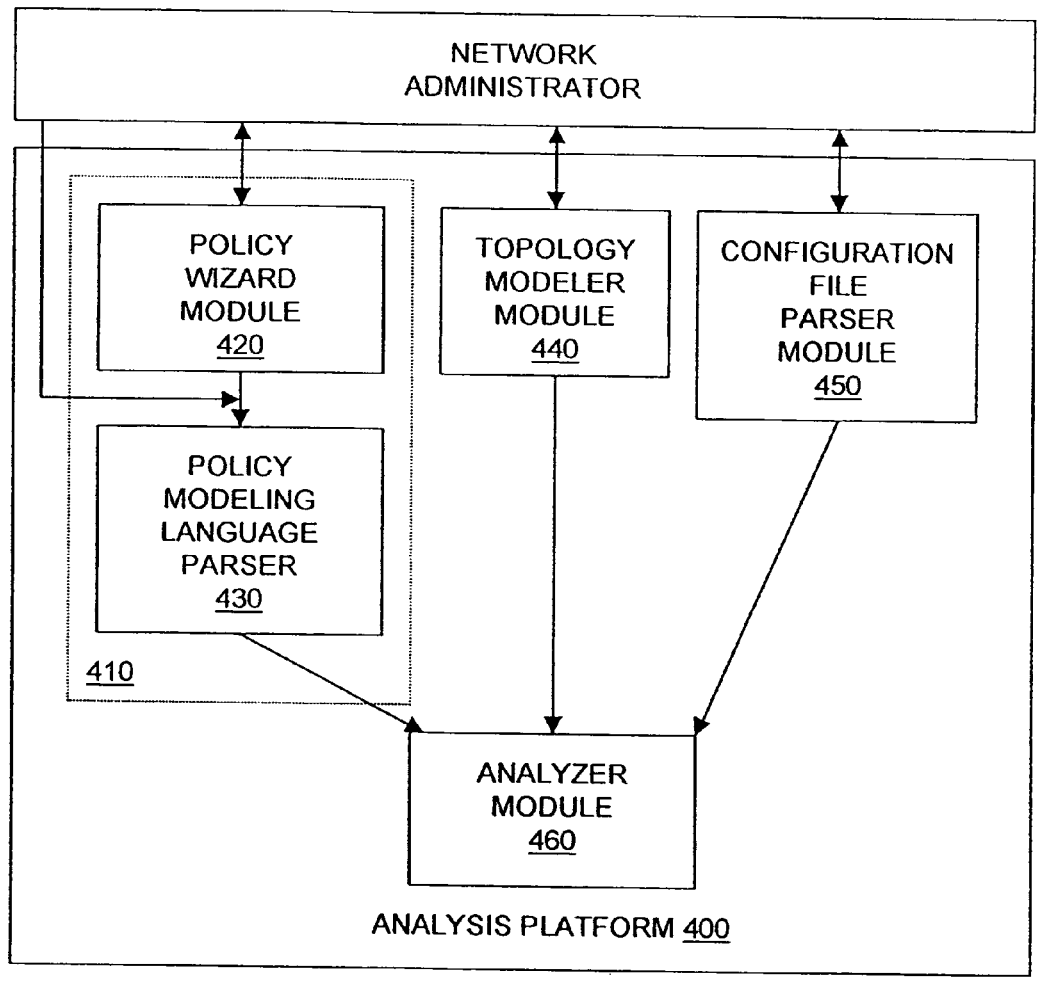
FIG. 4 is a block diagram illustrating a module structure of an analysis platform in accordance with the present invention.

FIG. 4 is a block diagram illustrating a top-level module structure of an embodiment of an analysis platform (e.g., available from the assignee) 400. The analysis platform 400 includes a Policy Modeler Module 410 having a Policy Wizard Module 420 and a Policy Modeling Language Parser 430. The Policy Wizard Module 420 is capable of assisting a network administrator in generating an instance of a Network Policy, which can be expressed as a PML program, or the like. The network administrator can also directly write a PML program that defines the network policy or business applications requirements for input to the analysis platform 400. The Policy Modeling Language Parser 430 then transforms the PML program into an internal data model.

The Policy Modeling Language is a simple descriptive language, which can capture the intended capabilities (requirements) of the network hosts. These capabilities define, among other things, the allowed access to a host, the allowed traffic interactions among the hosts, and the required security protection on each of the hosts. Additionally, the capabilities may include targeted applications servers, targeted host application version numbers (e.g. Oracle 5.0), targeted operating systems, targeted version/patch level for applications and operating systems, specification of paths, targeted classes of servers (i.e. one or more vulnerable target servers), the like for negative applications, i.e. threats.

The analysis platform 400 further includes a Topology Modeler Module 440. The Topology Modeler Module 440 can execute a network discovery phase (e.g., by employing the Network Discovery Wizard Module 320) for discovering the topology of the corporate network, including the locations of the network devices and the interconnections between the network devices. Once the network discovery phase has been performed, the Topology Modeler Module 440 can transform the newly acquired knowledge of the network topology into an internal data model. The Topology Modeler Module 440 can also prompt the network administrator for the location(s) and/or the access authorization information (e.g., passwords) of the respective configuration file(s) of the newly discovered network devices.

The analysis platform 400 also includes a Configuration File Parser Module 450 for reading the configuration files of the relevant network devices. The Configuration File Parser Module 450 is capable of understanding the syntax and semantics of the different configuration files that may be found in the relevant network devices. The Configuration File Parser Module 450 then transforms the contents of each of the configuration files and forms an internal data model, which may be independent of the make of the particular network device. For example, there is an internal data model for the configuration of a router, another internal data model for a firewall, VPN, etc.

After the Policy Modeler Module 410, the Topology Modeler Module 440, and the Configuration File Parser Module 450 have processed all the required information, the internal data models contain both the Network Policy or requirements and the actual Network Configuration Model (including the network topology). An Analyzer Module 460 of the analysis platform 400 can now start its work. For each defined capability of each host (in the Network Policy), the Analyzer Module 460 generates one or more queries regarding the Network Configuration Model. Answers to the queries can either confirm or deny that the defined capability has been correctly realized. For example, with respect to a network host having the capability of a DNS server, queries regarding the type of traffic that can reach the server, the type of traffic that can leave the server, and what security and performance settings are on the server may be part of the set of queries. The Analyzer Module 460 then executes the collected set(s) of queries. This involves executing various algorithms on the data structures representing the Network Configuration Model. Finally, the Analyzer Module 460 collects the answers to the queries and issues a report with appropriate entries for each detected violation.

Figure 5:
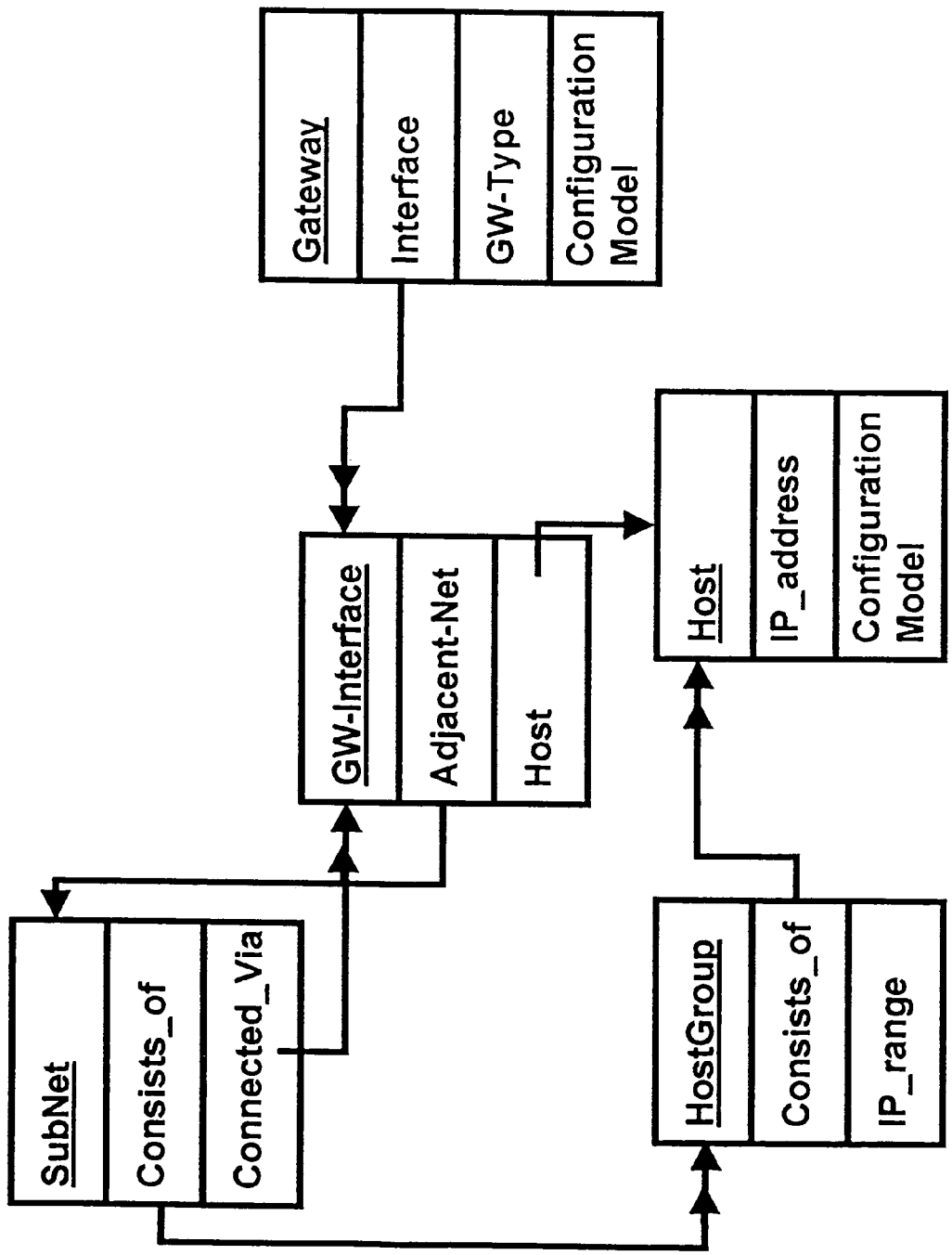
FIG. 5 is an entity-relationship model representing a network topology in accordance with the present invention.

FIG. 5 illustrates a portion of an embodiment of an Entity-Relationship (ER) model representing a network topology. In the illustration, a single arrow denotes a one-to-one relationship while a double arrow denotes a one-to-many relationship. An analysis platform (e.g., available from the assignee) uses the ER model to capture and model the topology of the corporate network. The relevant data concerns sub-networks (SubNet) of the network under consideration, and the gateway interfaces (GW-Interface) connecting the SubNet. Each SubNet consists of a plurality of HostGroups. Each HostGroup consists of a plurality of Hosts and has a range of IP addresses (IP range). Each Host has an IP address (IP address). The Gateways switch packets between the SubNets and can typically include routers, firewalls, or network switches (e.g., an ATM switch). The ER model also includes pointers to the configuration models of the gateways and the relevant hosts (servers). The ER model includes a vendor-independent configuration model for each type of Gateway (firewall, router, switch), which allows the Analyzer Module 460 to simulate the actions of the gateway when it receives a given type of IP traffic.

Figure 6:
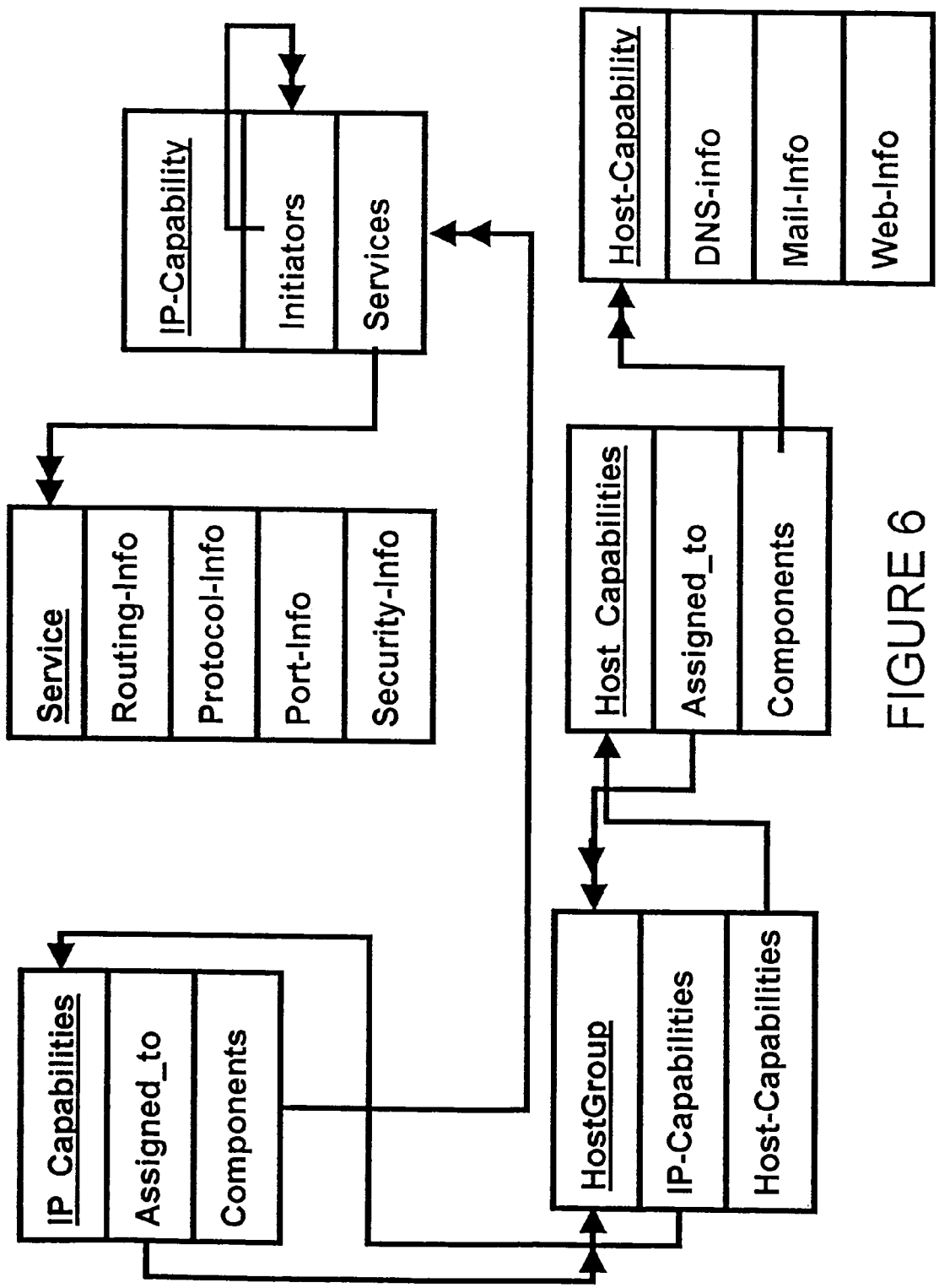
FIG. 6 is an entity-relationship model representing a network policy in accordance with the present invention.

FIG. 6 illustrates a portion of an embodiment of an Entity-Relationship (ER) model representing a Network Policy. In the illustration, a single arrow denotes a one-to-one relationship while a double arrow denotes a one-to-many relationship.

A group of application hosts (HostGroup) can have capabilities associated therewith. In the illustrated embodiment, the ER model distinguishes two kinds of capabilities: IP-Capabilities and Host-Capabilities. An IP-Capability describes IP-based traffic, possibly including its source (defined as another capability), security (encryption) requirements, routing requirements, protocol requirements and more. Hosts associated with such IP-Capability are allowed to be the recipient of the described IP-based traffic. Of course, the description of routing and security properties will require further modeling. Optional features include integration with emerging standards for routing and encryption policies, such as the Routing Policy Specification Language (RPSL), a proposed standard for a Routing Policy Format), and encryption policies currently under study by the Internet Engineering Task Force (IETF) Security Policy Working Group.

A Host-Capability models a host's functionality (business requirements) and configuration (e.g., as a server for DNS, Mail, Web or other server functionalities). The ER model provides a specific configuration model for each of the functionalities. The capabilities can be defined and written in the Policy Modeling Language (PML) in the form of a PML program.

The ER models form a data repository, which enables the Analyzer Module 460 to verify that the capabilities defined in the policy are indeed realized in the network configuration (e.g. required IP traffic realized), and, equally important, that no other capabilities are allowed (e.g. extraneous IP traffic noted). The analysis performed by the Analyzer Module 460 includes simulation of relevant network devices and the nature of the interconnections between the network devices to determine how certain IP-based traffic flows through the network under consideration. The analysis also includes (software) simulation of the servers' actual configurations by responding to TCP-based incoming client requests (e.g., DNS, mail, threats).

The analysis platform of the present invention uses a scripting language, such as the Policy Modeling Language (PML), to enable the network administrator to expressly define the capabilities of each of the network devices in the PML program. As part of the analysis process, the PML program is translated into the ER model. The capabilities can then be used in the ER models.

A capability, such as the Host-Capability, can be pre-defined. In this case, the PML parser recognizes the name of the capability. For example, the PML parser understands that the capability "dns_server" refers to a host being able to receive and send name-server related traffic from just about any source.

A capability can also be custom-defined in PML by defining the corresponding services and host groups. For example, consider the capabilities of a "hardened mail server" and "vulnerable mail server". The "hardened mail server" is typically a host that is easily accessible to a public network (e.g., the Internet). The "vulnerable mail server" is typically a host on a trusted network for delivering mail, for example, to the employees of a corporation. The network administrator defines the "hardened mail server" (in the appropriate syntax of PML) as receiving mail (SMTP, which is TCP on port 25) from any machine on the Internet, and defines the "vulnerable mail server" as receiving SMTP only from machines which have been assigned the capability of "hardened mail server". Thus, the "vulnerable mail server" is not accessible to the public network.

PML language constructs also allow for expressing routing policies and encryption policies as the policies relate to defined services and host groups, and to server policies for dns, mail, and other services. In various embodiments, PML language constructs model specific host applications such as threats, or the like. A PML program defining the corporate network policy is simply a text (ASCII) file that can be stored on the analysis platform.

Figure 7:
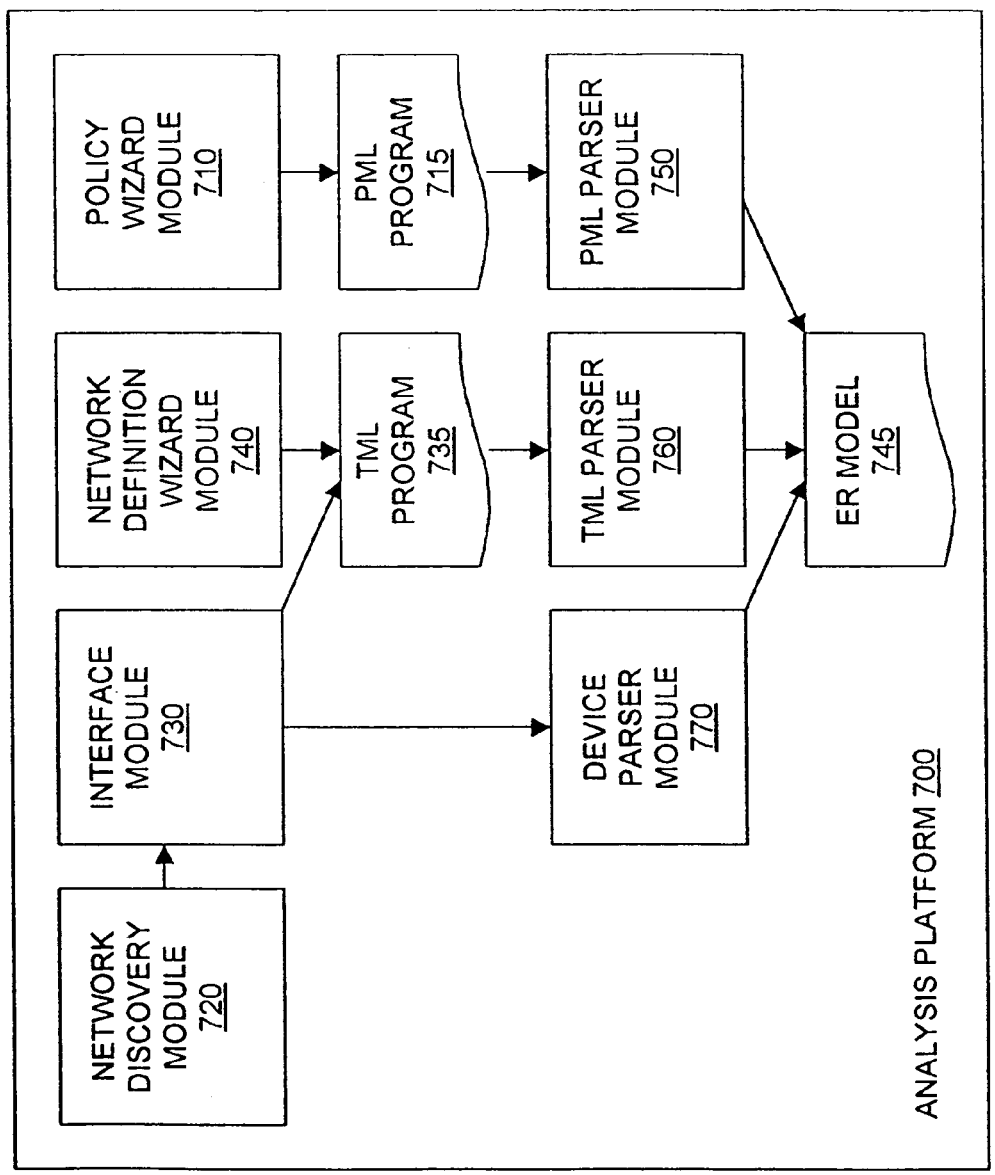
FIG. 7 is a block diagram illustrating a more detailed module structure of an analysis platform in accordance with the present invention.

FIG. 7 is a block diagram illustrating a more detailed module structure of an embodiment of an analysis platform 700. The analysis platform 700 includes a Policy Wizard Module 710, a software tool for allowing the network administrator to define capabilities without actually programming in PML, but rather, by filling out forms and templates (e.g., Web-based forms). The Policy Wizard Module 710 then transforms the information obtained from the network administrator into a PML program 715. The following is merely an example of a fragment of a PML program, in a possible embodiment of syntax, for defining the capabilities of the two types of mail servers discussed above:

vuln_mail_server_cap <-> hardened_mail_server_cap: (TCP, 25)

hardened_mail_server_cap <-> Internet_cap: (TCP, 25)

In another example, the network administrator wants to set a policy such that the internal routers, using either the Routing Information Protocol (RIP) or the Open Shortest Path First (OSPF) routing protocol, can only accept route updates from routers that are trusted by the network administrator. In various embodiments, the network administrator may specify the specific routes traffic may traverse within the network. The following is an embodiment of the corresponding PML syntax:

internal_router_cap <-trusted_router_cap: (RIP_update, OSPF_update)

In a further example, the network administrator wants to define a policy component for VPN gateways to encrypt and decrypt all traffic with 128-bit key strength between them. The following is an embodiment of the corresponding PML syntax:

vpn_gtw_cap <-> vpn_gtw_cap: enc.sub.--128 k

Information regarding the basic interconnection of gateways and sub-networks in a network, along with the corresponding IP-address ranges of the gateways and sub-networks, can be obtained using commercially available network discovery tools. For example, HP Openview's Network Node Manager collects this data and displays it as a network map.

The analysis platform 700 further includes a Network Discovery Module 720 for collecting network topology information. In one embodiment, the Network Discovery Module 720 may incorporate one of the commercially available network discovery tools (e.g., HP Openview's Network Node Manager). The Network Discovery Module 720 employs an Interface Module 730 (e.g., an HP Openview interface if the HP Openview tool is used) for extracting the collected information underlying the displayed network map and for translating the information into a TML program 735. The TML program 735 uses a scripting language, such as a Topology Modeling Language (TML), to define the topology of the network. The network administrator can then add to this basic TML program 735 by defining additional host groups, with their associated IP ranges or set of IP addresses. The network administrator can further add to the TML program 735 by defining the IP addresses corresponding to network devices to be analyzed (e.g., firewalls, routers, etc). More importantly, the network administrator can attach capabilities, which are defined in the corresponding PML program 715, to the host groups. Analogous to the PML program 715, the resulting TML program 735 is a simple text (ASCII) file, which can be stored on the analysis platform 700.

The analysis platform 700 further includes a Network Definition Wizard Module 740, a software tool for allowing the network administrator to define host groups and network devices in the network, and to attach capabilities to the host groups and network devices without actually programming in TML, but rather, by filling out forms and templates (e.g., Web-based forms). The Network Definition Wizard Module 740 then transforms the obtained information into a TML program. The Network Definition Wizard Module 740 can also allow the network administrator to edit an existing TML program, such as the TML program 735 created by the Interface Module 730. The following is a fragment of the TML program 735, in a possible embodiment of syntax, for defining a Cisco IOS router with the name "internal_router_nyc" as having two interfaces (if1, if2), along with the respective IP addresses. A sub-network "dmz" is coupled to the rest of the network by two routers, one of which is the router "internal router nyc" at its "if1" interface. A host "mail server" is on the "dmz" sub-network since the IP address of the host falls within the IP address range of the "dmz" sub-network.

1   GATEWAYS   {internal_router_nyc={if1: {IP=111.222.1.1, if2: {IP=111.222.2.1} MAKE cisco_ios WITH internal_router_cap} SUB-NET {dmz=[111.222.1.0/24]: {if1, if3} WITH server_cap} HOST {mail_server= [111.222.1.17] WITH hardened_mail_server_cap}

The network administrator can attach the capability "internal_router_cap" to the router "internal_router_nyc." The network policy and the network topology can thus be joined on the analysis platform 700. The TML program 735 further defines a sub-network "dmz" coupled, at one end, to an external router and a host with the name "mail_server" in the sub-network "dmz." The host has been assigned the capability "hardened_mail_server_cap."

Each network device has a configuration file associated therewith. The network administrator typically reads from and writes to a configuration file of a network device by opening, for example, a secure (password protected) telnet session (from his/her desktop) to the network device. The network administrator can manually place all configuration files of the relevant network devices (as defined in the TML program above) in a pre-defined directory on the analysis platform 700 and add the corresponding path and access information to the TML program 735. Alternatively, the network administrator can add, in the TML program 735, a remote location and password for each configuration file to allow the analysis platform 700 to access the configuration file of a network device or a host and to collect the configuration files automatically. Following is a fragment of the TML program 735 provided above, which has been extended to include the location of the configuration file of the interface if1 of the router "internal router nyc":

2   GATEWAYS   {internal_router_nyc={if1: {IP=111.222.1.1, FILE="/Ontura/conf_files/rules_if1"}}

The analysis platform 700 further includes a plurality of software modules for building an internal ER model 745, using the TML program 735 and the PML program 715 as inputs. The ER model 745 is typically a data structure stored in main memory while the analysis platform 700 is performing its analysis of the network. FIGS. 5 and 6 illustrate portions of an embodiment of an ER model. From this description, a programmer can easily build actual data structures in high-level programming languages, such as C or Java, using arrays and dynamic pointers (for dynamic storage allocation).

A PML Parser Module 750 is built using standard compiler technology to parse each capability definition of the PML program 715 and to create an instance of the ER model 745 for the capability in the main memory of the analysis platform 700. For example, the software tools "lex" (or "flex") and "yacc" (or "bison"), which are freely available in the UNIX operating system environment under the GNU license, can be used to implement the PML Parser Module 750. It is standard practice to program these tools with the syntax of the language under consideration (in this case, PML) and an output structure (in this case, the ER model) to thereby obtain a module (the PML Parser Module 750) for transforming the PML program 715 into the ER model 745.

A TML Parser Module 760 is built using standard compiler technology to parse each statement in the TML program 735 and to create an instance of the ER model 745 representing the sub-network, host group, or network device defined by the statement, together with its connectivity. A possible way to implement the TML Parser Module 760 is with the lex and yacc software tools. Each time the TML Parser Module 760 encounters, in a TML statement, a network device which needs to be analyzed, the TML Parser Module 760 calls an appropriate Device Parser Module 770 for the particular network device. The TML Parser Module 760 also passes to the Device Parser Module 770 the device type (e.g., router) and make (e.g., Cisco IOS version x.y).

The Device Parser Module 770 is a software module for creating a configuration model for the network device. The Device Parser Module 770 obtains the configuration file of the network device (e.g., from the TML program) and parses the configuration file using standard compiler technology (e.g., tools such as lex and yacc). The Device Parser Module 770 is capable of parsing the syntax of the different types of configuration files associated with the network devices. The configuration model is preferably different for each type of network device (e.g., firewall, router), but is preferably the same for a particular type of network device independent of vendor. That is, the configuration model for a network device, such as a firewall, captures all the salient configuration features of a firewall (e.g., rules to determine if an IP packet is passed or dropped) by abstracting from the vendor specific expression of these rules.

The configuration model is part of the ER model 745 and describes the actual configuration of a particular network device. For example, if the network device is a firewall, the configuration model captures the filtering rules, such that the analysis platform 700 can simulate the behavior of the firewall when receiving a given IP packet. The description is general, yet detailed enough to capture the different kinds of firewalls (i.e., the "lowest common denominator").

For example, access control lists (ACLs) in Cisco routers filter IP traffic without keeping any internal state (i.e., are "stateless"). Consequently, a configuration file for allowing an incoming telnet session should specify the incoming TCP initiation packets and the outgoing reply packets. In a firewall with "stateful" inspection (e.g., a Checkpoint firewall), the configuration file only needs to allow incoming telnet traffic because the internal state automatically remembers to pass the outgoing reply packets.

The configuration model thus needs to capture the lowest level of configuration granularity (e.g., the level of ACL or lower, in the case of firewalls). Therefore, when parsing a configuration file for a Checkpoint firewall, the Device Parser Module 770 needs to generate, for each "stateful" rule, at least two rules in the configuration model, describing the allowed traffic in each direction. Similarly, for routers, VPNs, gateways, etc., the Device Parser Module generates a configuration model that expresses the device configuration data at the lowest level of abstraction.

Figure 8:
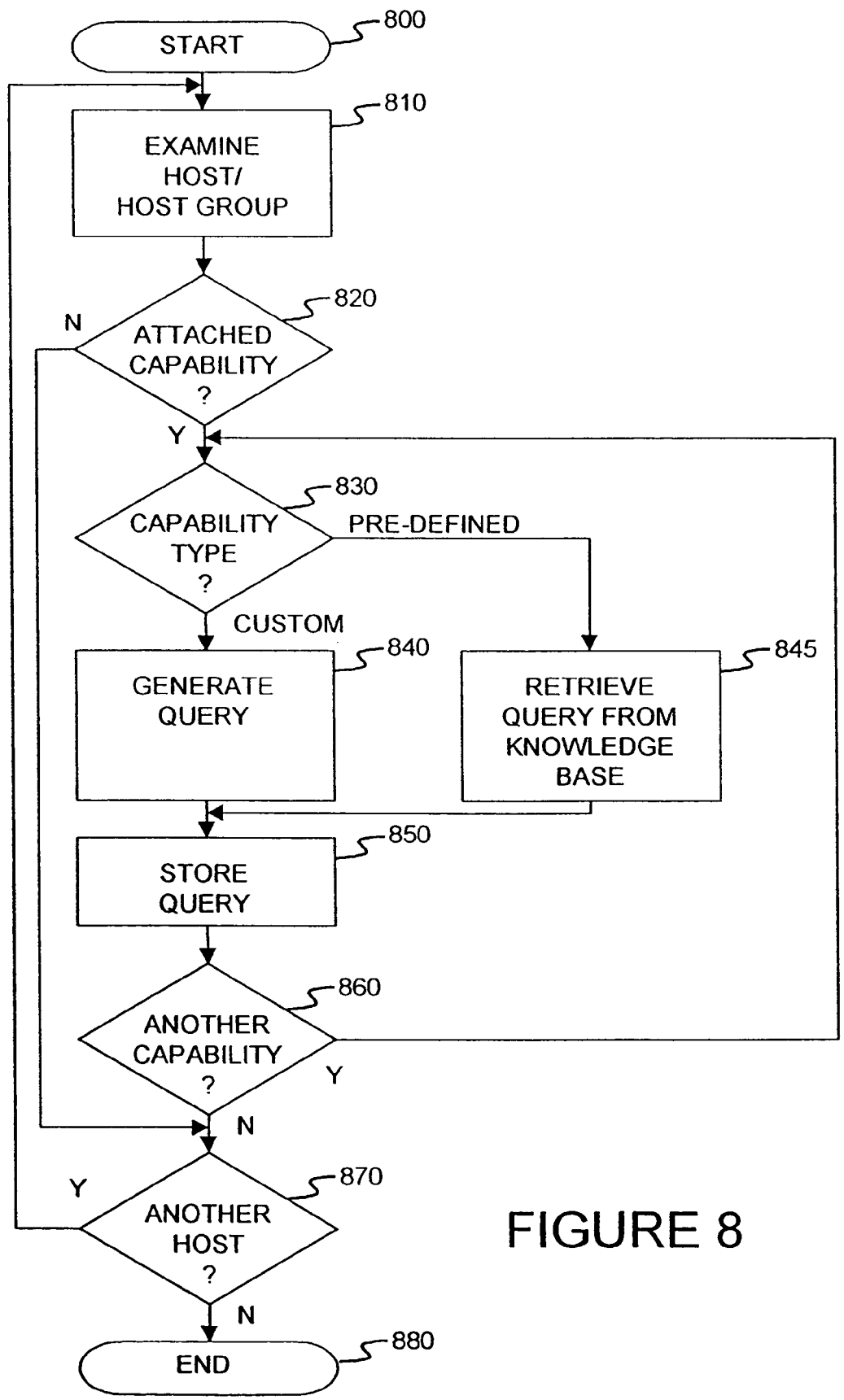
FIG. 8 is a flow diagram illustrating the operation of a query generator in accordance with the present invention.

FIG. 8 is a flow diagram illustrating the operation of a query generator in accordance with the present invention. The process starts at step 800. In step 810, the query generator traverses (in a memory of the analysis platform) the data structure representing the ER model for the network under consideration. For each host or host-group, the query generator determines if it has an attached capability (step 820). If there is an attached capability, the query generator then determines the type of capability (custom or pre-defined) in step 830.

For each attached capability, the query generator generates the appropriate queries. For IP capabilities, for example, typically traffic flow queries are generated. A traffic flow query asks what IP-based services can move trough the network under consideration, either from or to (or both) the fixed host-groups or hosts (source and destination, respectively), and can also include sub-queries about the routes of the traffic under consideration.

If the capability is a custom-defined capability (Custom in step 830), such as a simple custom-defined IP capability (no routing or security info is included in the service), the queries can be generated in a rather straightforward way (in step 840). One or more traffic flow queries are generated, which have the current host-group as destination and represent all the possible sources. For example, if a host H has the capability "trusted_mail_server_cap" as defined earlier, then the query generator can add the following query: "what IP traffic, from any source, can reach host H as its destination?"

If the capability is a pre-defined capability (Pre-defined in step 830), the queries can be retrieved from a knowledge base (in step 845). For simple pre-defined IP capabilities (e.g., "dns server"), the query generator accesses the knowledge base to retrieve the required queries.

For host capabilities, server behavior queries are generated. The nature of the queries is dependent on the capability itself. For example, a "dns-info" capability may specify whether the server is a "primary server", "secondary server", or just a "resolver" and may also specify how the server should initialize its cache. Queries directed at the dns configuration model can be generated to verify the capability. The queries are then stored in step 850. As one exemplary solution, the queries are stored in main memory, possibly in an array data structure.

Then, in step 860, the query generator determines if the host or host group has another attached capability. If so (Yes in step 860), the process returns to step 830 to determine the capability type. Otherwise (No in step 860), the process continues to step 870 wherein the query generator determines if there is another host or host group in the network to be analyzed. If there is another host or host group (Yes in step 870), the process returns to step 810 wherein the host or host group is examined. Otherwise (No in step 870), the process ends at step 880.

The knowledge base contains the expert knowledge of the analysis platform, including security knowledge, network administration knowledge, etc. For example, the knowledge base may include queries that need to be asked to ensure that the security delivered by all the filtering devices present is adequate for the pre-defined capabilities, such as "mail-server", "dns-server", etc. For example, the knowledge base understands that "dns-server" is a sensitive capability and that no unauthorized host should be able to telnet to a host with the dns-server capability. The knowledge base contains information for each pre-defined capability. The internal structure of the knowledge base may be simple file-based name-value pairs or a small database. The knowledge base has an interface that allows updates to be made by the staff of the analysis platform as part of upgrades to the analysis platform. Additionally, the knowledge base can be updated by a network administrator who wishes to encode some of his/her expert knowledge into the knowledge base.

Figure 9:
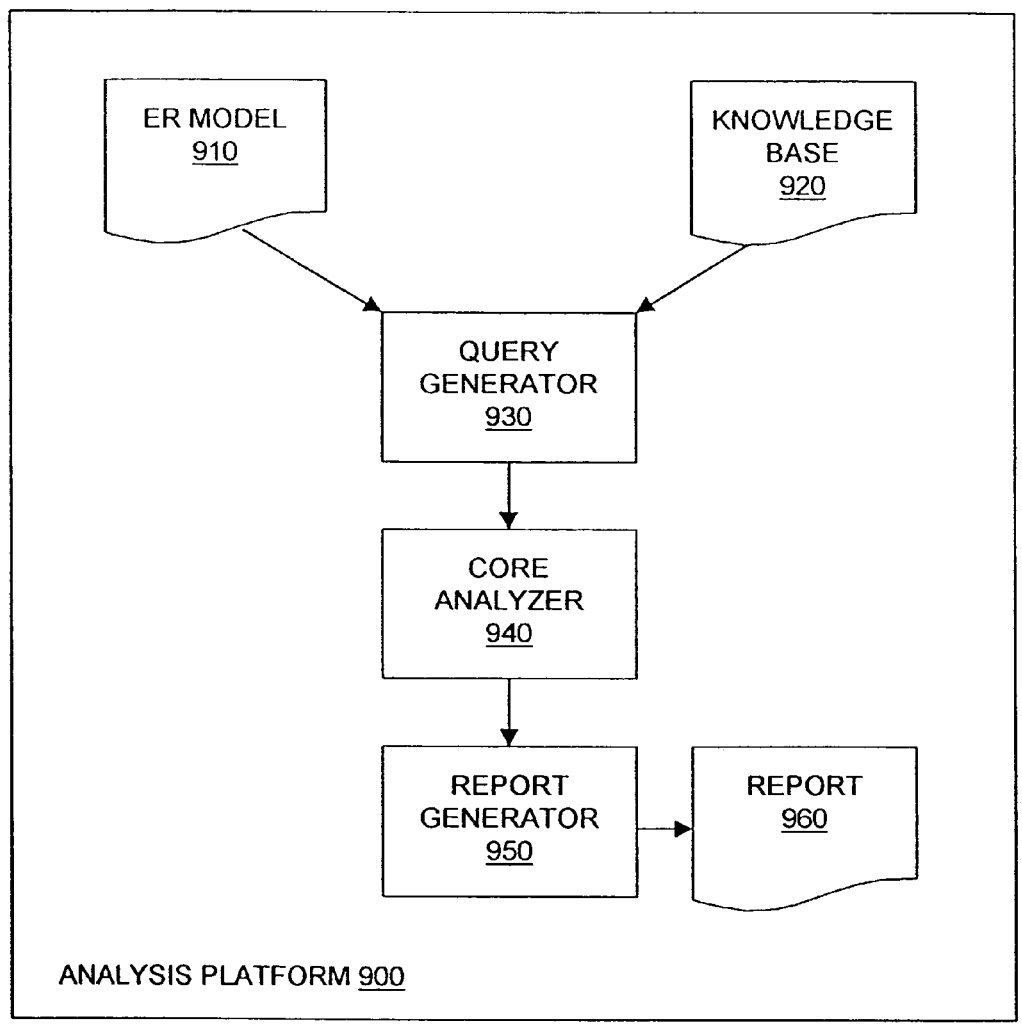
FIG. 9 is a block diagram illustrating a portion of a module structure of an embodiment of an analysis platform.

FIG. 9 is a block diagram illustrating a portion of a module structure of an embodiment of an analysis platform 900. The analysis platform 900 includes a Query Generator 930 that generates the appropriate queries for analyzing a network based on an ER Model 910 of the network and a Knowledge Base 920, which contains the security expert knowledge of the analysis platform 900.

The analysis platform 900 further includes a Core Analyzer 940 that traverses the main memory data structure containing all the queries. For each query, the Core Analyzer 940 executes the following: If the query is a traffic flow query, then the Core Analyzer 940 executes a flow analysis algorithm on a graph, derived from the connectivity information in the ER Model 910. The Core Analyzer 940 starts with the source of the flow and computes all the paths the flow can follow to reach the destination. Each node in this graph is a gateway and each edge is a sub-network connecting the two gateways. The Core Analyzer 940 consults the configuration model for the gateway device (which is part of the overall ER model) and uses the configuration model to simulate the gateway's behavior (under its current configuration) and thereby obtains the gateway's actions, such as filtering, encrypting/decrypting or forwarding/routing to another sub-network. The Core Analyzer 940 also consults the configuration of the source and/or destination to understand whether these hosts influence the traffic flow. The Core Analyzer 940 writes the resulting flows to a file, where all the query's answers are accumulated. For example, the query "what IP traffic, with any source can reach host H as its destination?" from above causes the Core Analyzer 940 to execute a traffic flow analysis that returns all the IP traffic which can reach host H as destination, given the current configuration of all the gateway and hosts in the network under consideration.

If the query is a server behavior query (e.g., DNS server configuration), then the Core Analyzer 940 retrieves the corresponding values of the configuration model of the host under consideration. The values are then interpreted to simulate the resulting behavior, which is presented in the answer file.

Finally the Core Analyzer 940 scans through the answers generated in response to an analyzed capability to determine whether the collection of answers indicates any unwanted traffic or functionality or, at the other extreme, whether there are any missing traffic or functionality (in other words, a policy violation). In other examples, Core Analyzer 940 may determine whether "negative" applications or threats can communicate to one or more targeted servers and specify the routes the threats traverse in the network, whether threats can receive data from the one or more targeted servers and the traversed routes in the network, and the like.

If so, the Report Generator 950 is invoked. The Core Analyzer 940 passes the corresponding capability and the answer causing the violation. For traffic flow queries and answers, the Core Analyzer 940 might also pass the gateway, which causes the violation. For example, the answer to the above query regarding host H may reveal that telnet traffic from any host in some corporate sub-network is able to reach host H. This traffic is not part of the traffic specified by the attached capabilities for host H. As another example, the query regarding host H may reveal that host H cannot receive traffic from the network that it requires. In either case, the Core Analyzer 940 consequently invokes the Report Generator 950 and passes to the Report Generator 950 information regarding host H, the telnet traffic and its sources, and possibly the gateway or host configuration that passes the telnet traffic instead of filtering it out.

In another example, a server might have a host capability for DNS, which indicates it should be a primary server. The executed query might reveal that the actual configuration makes the server a secondary DNS server. Again, the Core Analyzer 940 invokes the Report Generator 950, with the information regarding the host, including the part of the host configuration that causes the server not to fulfill the desired capability.

As another example, a report may include a description of whether a negative application or threat from an application host outside the network or from an application host inside the network can reach one or more targeted servers within the network, i.e. whether the threat is successful or not. Additionally, the report may specify the attempted routes or chains of attack within the network that the threat traverses. In additional examples, although the specified negative applications or threats may not reach the respectively targeted servers, a report may be generated that describes the penetration of the threats. For example, a report may detail how a virus penetrates a network, is routed within the network (e.g. chain of attack), but does not reach its destination because it is blocked by a specific network device. In various embodiments, the chain of attack may be represented visually as a list of devices in the chain of attack or as one or more graphs.

In various embodiments, threats may be ranked or prioritized in terms of severity, based upon (threat) metrics from the report data. For example, the priority may based upon whether an attack can crash a server, whether the attack can obtain root access to a server, or the like. This prioritized list of threats (from the library of threats) may also be used by the network administrator to determine which threats to address or remediate first. Examples of prioritization of threats may be based upon one or more of the following: whether a threat can reach a respective targeted server or not; how far within the network the threat penetrates; for multiple threats, if there are common servers which the threats pass through within respective chains of attack; if there are application servers running the targeted application and/or the correct version/patch level of the targeted application and/or operating system; the ease in making a remedial change, and the like. In various embodiments, because a chain of attack for the threats are computed, the network administrator is given many options on how to remediate the threat. For example, the network administrator may simply sever the last link in a chain of attack, the first link in the chain of attack, or the like.

In various embodiments of the present invention, the threats may be modeled as hosted by applications servers external to corporate network 100. In other embodiments, the threats may be modeled as hosted by application servers within corporate network 100. For example, a user at computer 160 may download a threat such as virus, Trojan, spyware, worm, or the like. In such cases, the threat may attach itself to an application server, such as a mail server, a database system, or the like. Accordingly, in various embodiments, threats may be modeled as coming from a variety of locations within corporate network 100 or outside corporate network 100.

The Report Generator 950 creates a formatted file (Report 960) with an entry for each time that it was invoked by the Core Analyzer 940. The Report Generator 950 can format the file in HTML for easy viewing with a browser or can e-mail the file as ASCII text to the network administrator. An example of an entry, generated for the policy violation concerning the trusted mail server host H (see above) might look as follows. The entry includes specifications about which part of the policy (e.g., which capability) is not being enforced, the host(s) that are affected, how the violation manifests itself, and which device needs to re-configured to remove the violation. The Report Generator 950 obtains all the necessary information from the Core Analyzer 940 each time it is invoked to generate another entry. The entry below (e.g., the 5th in the Report 960) indicates that the router "internal_router_nyc" needs to filter telnet traffic from the corporate sub-net to the mail server.

POLICY VIOLATION ENTRY #5:
CAPABILITY: trusted_mail_server_cap
HOST: mail_server [111.222.1.17]
VIOLATION: telnet FROM corp_net
CONFIGURATION: internal_router_nyc Alternatively, graphical representations may also be incorporated as part of the Report 960. The Report 960 may include a map of the network under consideration, highlighting the hosts that are affected by policy violations in one particular fashion and highlighting network devices whose configurations cause the violations in a different fashion.

Up to this point, the analysis platform has been used to define a network policy, to collect all the necessary data (configuration files, network topology, etc.) regarding a network, and to obtain reports indicating violations of the configuration of the network against the network policy. A network administrator can establish the network policy and use the report generated to correct the initial problems with the configuration files. The analysis platform can also be used in another mode of operation. After the initial configuration of the network devices has been performed, the network administrator and his/her team will likely have to make changes to the configuration files of the network devices to accommodate changes within the company, such as new business relationships, new internal corporate structures, etc.

Figure 10:
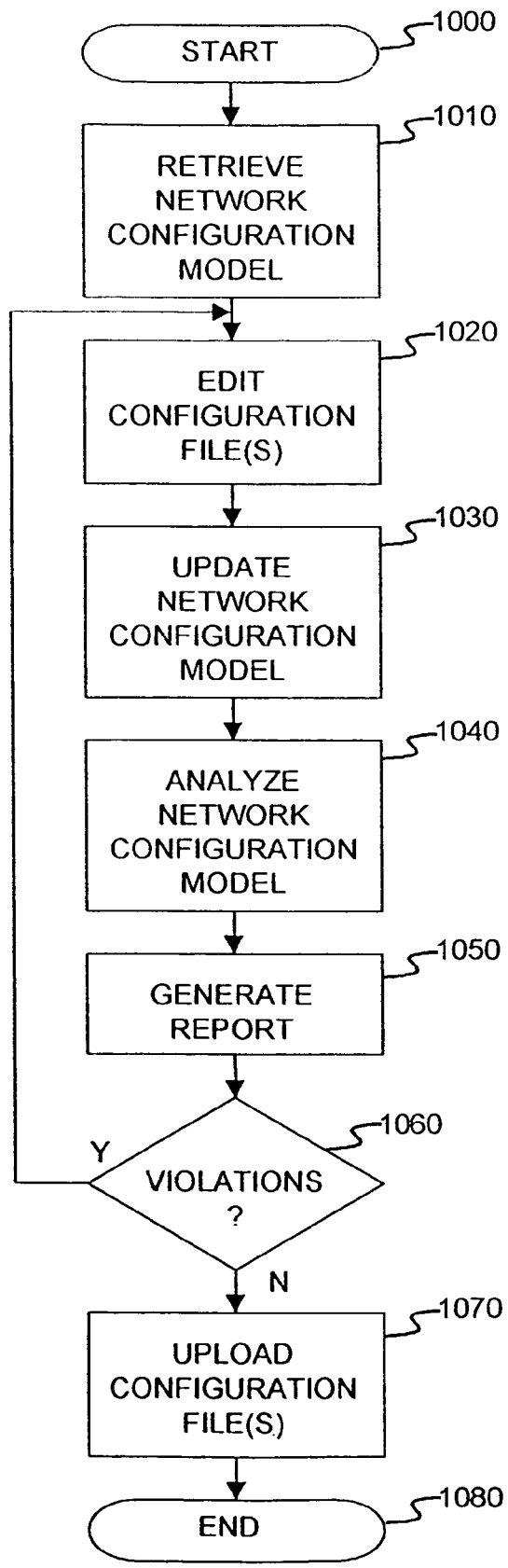
FIG. 10 is a flow diagram illustrating an operation of the analysis platform in analyzing changes to the configuration files of the network devices.

FIG. 10 is a flow diagram illustrating an operation of the analysis platform in analyzing changes to the configuration files of the network devices. The process begins at step 1000. Since the Network Configuration Model already exists on the analysis platform, at step 1010, the Network Configuration Model is retrieved. The network administrator can edit one or more configuration files with his/her proposed changes and upload the new configuration file(s) to the analysis platform in step 1020. In step 1030, the analysis platform updates the Network Configuration Model in response to the new configuration file(s).

Then, in step 1040, the analysis platform analyzes the changed Network Configuration Model against the network policy and, in step 1050, generates a report indicating the violation(s) against the network policy (if any) caused by the changes to the configuration files. For example, an error in a configuration update for a firewall device can cause all employees at a given corporate site to lose access to the Internet. Without the use of the analysis platform, the administrator would only detect such an error after receiving phone calls from these employees. With the analysis platform, the network administrator can submit configuration changes to the analysis platform to see the effects of the changes, before actually committing these changes to the network device(s), thereby avoiding the above situation.

If there are violations of the network policy (Yes in step 1060), the process returns to step 1020 to allow the network administrator to correct the configuration file(s) that are in error. If there are no violations, the process can continue to an optional step 1070 wherein the analysis platform functions as a telnet pass-through to allow change(s) to the configuration file(s) to be uploaded to the corresponding network device(s). Instead of telnetting directly into a network device, the network administrator can telnet into the analysis platform and upload the changed configuration file (step 1020). The analysis platform then updates the ER model accordingly (step 1030), runs the analyzer (step 1040), and if there are no new violations against the existing policy (No in step 1060), a distributor module on the analysis platform transfers the updated configuration file to the corresponding network device in the network (step 1070), and the process ends at step 1080.

Changes in business relationships and corporate structures may necessitate a change in the network policy. For example, a new external business partner might need direct access from its site to some of the company's sub-networks. In this case, the network administrator needs to change the network policy in addition to changing the configuration files of some devices. Similarly to the previous variation, the network administrator can submit changes to the network policy (either by using a Policy Wizard Module, or by directly changing the PML and/or TML programs stored on the analysis platform) and corresponding changes to configuration files (of the network devices) for the existing Network Configuration Model on the analysis platform. The analysis platform then restarts the analysis, using the changed network policy and configuration files. The analysis platform can then generate a report as before. This report now pinpoints the configurations of those network devices (either freshly submitted or original) that need to be changed in order for the network to adhere to the changed network policy. As discussed in the previous section, the information provided by the report greatly improves the speed and quality of implementing the required changes in the network configuration to support evolving business and corporate functions.

In various embodiments, combinations of the above embodiments are contemplated. For example, in some embodiments, a host application server within the corporate network can be host for both a "positive" application, such as a DNS, mail server, or the like, as well as a negative application, such as a virus, or the like. Such examples may be used to determine what happens if a threat penetrates the corporate network and attaches itself to an existing host application server. Using the techniques described above, the simulation may then determine whether the threat on the existing host application server can send and/or receive the type of IP traffic it desires. Similar to the above, the determination may be made with respect to one or more targeted servers, e.g. a database server within the corporate network, or a generalized class of targeted server, e.g. any host application server running a specific version of an operating system, or the like, within the corporate network. If the threat's IP traffic send and/or receive requirements are met, a report may indicate a vulnerability of the threat on the host application server.

In embodiments such as described above, after running the analysis, the report may also report "conflicting" IP traffic requirements. For example, a host application server may host a Web server that expects IP traffic on port 80 from the Internet; at the same time the host application server may also host a threat that propagates on port 80. Accordingly, embodiments of the simulation described above may indicate that the Web server application on the host application server can receive the expected IP traffic on port 80, but the threat can also send the expected IP traffic (propagate) on port 80. In light of the above, in one embodiment, a report that may note that shutting off IP traffic to port 80 for the host application server is not a solution to the problem as it would break the Web server application. Further, the report may suggest the user upgrade/patch the Web server application or upgrade/patch the host application server operating system to prevent the situation of "conflicting" IP traffic requirements. Other types of solutions may be suggested to the user to solve problems similar to the above.

In additional embodiments, proposed changes to business applications requirements are analyzed or changes to a network configuration (network topology and/or device configurations) are analyzed. In some embodiments, both changes to business application requirements and network configuration are analyzed. In each of these embodiments, a report may specify one or more of the following: whether an application host receives at least the required traffic, whether an application host can receive more than the required traffic, whether a negative application can reach a targeted server and the routing path (computed routing path) of the threat in the network, and the like.

Further embodiments can be envisioned to one of ordinary skill in the art after reading this disclosure. In other embodiments, combinations or sub-combinations of the above disclosed invention can be advantageously made. The specification, accordingly, is to be regarded in an illustrative rather than a restrictive sense. It will, however, be evident that various modifications and changes may be made thereunto without departing from the broader spirit and scope of the invention as set forth in the claims.

What is claimed is:

1. A computer implemented method performed by an analysis platform including a processor and a memory programmed to perform the method, the method comprising:
   determining by the analysis platform a plurality of network devices within a network arranged in a network topology, wherein the plurality of network devices includes a first application server hosting a first application; and a client computer hosting a client application;
   receiving by the analysis platform a policy for the network, wherein the policy comprises requirements; and wherein the requirements include a description of a first set of required network traffic associated with the first application server, the first application, the client computer and the client application;
   receiving by the analysis platform a plurality of configuration files associated with the plurality of network devices in the processor;
   building by the analysis platform an internal software configuration model of the network using the plurality of configuration files, the model comprising a plurality of network paths between at least one network gateway, the first application server and the client computer;
   analyzing the software network configuration model against the network policy, comprising:
   simulating, by the analysis platform, actions of the at least one network gateway relating to packets relating to the first set of required network traffic, comprising a request sent from the first client computer to the first application server; and
   simulating, by the analysis platform, a configuration of the first application server by preparing a response to the request and simulating the actions of the at least one network gateway when the response is sent from the fist application server to the first client computer
   determining by the analysis platform when the simulated actions of the plurality of network gateways processed the set of required network traffic as required by the policy; and
   generating by the analysis platform a report indicating whether the simulated actions of the plurality of network gateways processed the set of required network traffic as required by the policy.

2. The method of claim 1 wherein the first set of required network traffic comprises IP traffic.

3. The method of claim 2 wherein the first set of required network traffic includes traffic between the first application server and the client computer.

4. The method of claim 3 wherein the first application server is selected from a group consisting of: e-commerce server, domain name server, e-mail server, database server, financial data server, CRM server, ERP server, and data storage server; and wherein the client application is selected from a group consisting of: worm, virus, Trojan, spyware, and key logger.

5. The method of claim 2
wherein the plurality of network devices also includes a second application server hosting a negative application;
wherein the policy also comprises additional requirements associated with the second application server, wherein the additional requirements include a description of a second set of required network traffic and an additional targeted server associated with the second set of required network traffic;
wherein the method further comprises simulating, by the analysis platform, actions of the at least one network gateway relating to packets relating to the first set of required network traffic, comprising a request sent from the first client computer to the second application server; and
simulating, by the analysis platform, a configuration of the second application server by preparing a response to the request and simulating the actions of the at least one network gateway when the response is sent from the second application server to the first client computer
wherein generating the report further comprises generating by the computer system the report indicating whether the simulated actions of the second application server processed the set of required network traffic as required by the policy.

6. The method of claim 5
wherein generating the report further comprises determining a first plurality of threat metrics associated with the first application server and a second plurality of threat metrics associated with the second application server by the analysis platform.

7. The method of claim 6
wherein the report includes a prioritization of the first application server over the second application server;
wherein the prioritization is based upon threat metrics from the first plurality of threat metrics and the second plurality of threat metrics; and
wherein threat metrics are selected from a group consisting of: probability of threats, potential harm of threats, ease of remediation of threats, commonality of servers in both the first plurality of computed paths and the second plurality of computed paths.

8. The method of claim 2
wherein first application server also hosts a business application;
wherein the requirements include a description of a second set of required network traffic and a second server associated with the second set of required network traffic;
wherein the report also indicates whether the second network traffic includes at least the second set of required network traffic.

9. The method of claim 8
wherein the report indicates that the business application was successful when the second network traffic includes at least the second set of required network traffic.

10. The method of claim of claim 9
wherein a specific type of network traffic belongs to both the first set of required network traffic and the second set of required network traffic; and
wherein the report also indicates the specific type of network traffic.

11. The method of claim 10 wherein the report also indicates that inhibiting the specific type of network traffic would violate the policy.

12. The method of claim of claim 10 wherein the report also suggests an action selected from a group consisting of: upgrade to a different software version of the business application, install a software patch to the business application, upgrade to a different software version of an operating system of the first application server, install a software patch to the operating system.

13. An analysis platform comprising:
a memory storing a network topology of a network including a plurality of network devices, wherein the plurality of network devices includes a first application on a first application host, a client application on a client computer and wherein the memory stores a policy associated with the network, wherein the policy comprises requirements, wherein the requirements include a description of a first required set of network traffic associated with the first application, the first application server, the client application and the client computer and wherein the memory stores a plurality of configuration data for at least some of the plurality of network devices; and
a processor coupled to the memory, wherein the processor is configured to:
build an internal software configuration model of the network using the plurality of configuration data, the model comprising a plurality of network paths between at least one network gateway, the first application server and the client computer;
analyze the software network configuration model against the network policy, comprising: simulating actions of the at least one network gateway relating to packets relating to the first set of required network traffic, comprising a request sent from the first client computer to the first application server; and simulating a configuration of the first application server by preparing a response to the request and simulating the actions of the at least one network gateway when the response is sent from the fist application server to the first client computer
determine when the simulated actions of the plurality of network gateways processed the set of required network traffic as required by the policy; and
generate a report indicating whether the simulated actions of the plurality of network gateways processed the set of required network traffic as required by the policy.

14. The analysis platform of claim 13
wherein the packets relating to the first set of required network traffic comprise IP packets.

15. The analysis platform of claim 14 wherein the report indicates that the first set of required network traffic was processed as required by the policy.

16. The analysis platform of claim 15 wherein the report includes the plurality of network paths.

17. The analysis platform of claim 14
wherein the requirements associated with the first set of network traffic comprise data selected from a group consisting of: a specific application running on the first targeted application host, a specific version number for the application running on the first targeted application host, a specific patch level for the application running on the first targeted application host, a specific operating system running on the first targeted application host, and a specific operating system patch level running on the first targeted application host.

18. The analysis platform of claim 14
wherein the first application host is selected from a group consisting of: e-commerce application host, domain name application host, e-mail application host, database application host, financial data application host, ERP application host, CRM application host, and data storage application host; and
wherein the client application is selected from a group consisting of: worm, virus, Trojan, spyware, key logger.

19. The analysis platform of claim 14
wherein the plurality of network devices also includes a second application server hosting a threat;
wherein the policy also comprises additional requirements associated with the second application, wherein the additional requirements includes a second set of required network traffic.

20. The analysis platform of claim 19
wherein the report includes a prioritization of the first set of required network traffic over the second set of required network traffic in response to a metric selected from a group consisting of: threat probability, potential threat damage, ease of threat remediation, commonality of application hosts in both the first plurality of predicted computed paths and the second plurality of predicted computed paths.

21. A computer program product embodied in a non-transitory medium for a computer system including a memory comprising:
code that directs a processor to determine a network topology in response to a network topology and in response to user input;
code that directs the processor to determine a plurality of network devices within a network arranged in the network topology, wherein the plurality of network devices includes a first application on a first application server, and a client computer hosting a client application;
code that directs the processor to receive a policy for the network, wherein the policy comprises requirements associated with the first application server, wherein the requirements include a description of a first set of required network traffic;
code that directs the processor to receive a plurality of configuration data associated with the plurality of network devices;
code that directs the processor to build an internal software configuration model of the network using the plurality of configuration data, the model comprising a plurality of network paths between at least one network gateway, the first application server and the client computer;
code that directs the processor to analyze the software network configuration model against the network policy, comprising: simulating, by the analysis platform, actions of the at least one network gateway relating to packets relating to the first set of required network traffic, comprising a request sent from the first client computer to the first application server; and simulating, by the analysis platform, a configuration of the first application server by preparing a response to the request and simulating the actions of the at least one network gateway when the response is sent from the fist application server to the first client computer;
code that directs the processor to determine when the simulated actions of the plurality of network gateways processed the set of required network traffic as required by the policy; and
code that directs the processor to generate a report indicating whether the simulated actions of the plurality of network gateways processed the set of required network traffic as required by the policy.

22. The computer program product of claim 21 wherein the packets relating to the first set of required network traffic comprises IP packets.

23. The computer program product of claim 22 wherein the network topology includes changes to the network topology selected from a group consisting of: a new network device, a new application server, and moving an application from one application server to another application server.

24. The computer program product of claim 22 wherein the first application server is determined based upon criteria selected from a group consisting of: a specific application running on the first application server, a specific version number for the application running on the first application server, a specific patch level for the application running on the first application server, a specific operating system running on the first application server, and a specific patch level of a specific operating system running on the first application server.

25. The computer program product of claim 24 wherein the first application server is selected from a group consisting of: e-commerce server, domain name server, e-mail server, database server, financial data server, ERP server, CRM server, and data storage server.

26. The computer program product of claim 22 wherein the first client application is selected from a group consisting of: worm, virus, Trojan, spyware, key logger.

27. The computer program product of claim 22 wherein the plurality of network devices also includes a second server hosting a second application; wherein the policy also comprises additional requirements associated with the second application server, wherein the additional requirements includes a description of a second set of required network traffic.

28. The computer program product of claim 27 wherein code that directs the processor to generate the report further comprises code that directs the processor to prioritize the first set of required network traffic over the second set of required network traffic in response to a plurality of metrics.

29. The computer program product of claim 28 wherein a metric from the plurality of metrics is selected from a group consisting of: probability of threats, potential harm of threats, ease of remediation of threats, commonality of servers in both a first plurality of traffic paths between the first server and the second server and a second plurality of traffic paths between the second server and the client computer.

* * * * *